United States Patent
Tsuto et al.

(10) Patent No.: US 7,857,869 B2
(45) Date of Patent: Dec. 28, 2010

(54) PROCESS FOR PRODUCING DIESEL FUEL OIL FROM FAT

(75) Inventors: Keiichi Tsuto, Wakayama (JP); Tetsuya Koshikawa, Kyoto (JP)

(73) Assignee: REVO International Inc., Kyoto (JP)

( * ) Notice: Subject to any disclaimer, the term of this patent is extended or adjusted under 35 U.S.C. 154(b) by 464 days.

(21) Appl. No.: 10/580,340

(22) PCT Filed: Nov. 19, 2004

(86) PCT No.: PCT/JP2004/017260

§ 371 (c)(1),
(2), (4) Date: May 25, 2006

(87) PCT Pub. No.: WO2005/052097

PCT Pub. Date: Jun. 9, 2005

(65) Prior Publication Data

US 2007/0101640 A1    May 10, 2007

(30) Foreign Application Priority Data

Nov. 27, 2003    (JP) .............................. 2003-397391

(51) Int. Cl.
*C10L 1/08* (2006.01)
*C10L 1/19* (2006.01)
(52) U.S. Cl. .............................. 44/308; 44/388; 44/451
(58) Field of Classification Search .................. 44/605, 44/447, 388, 307, 306, 308, 451; 210/603, 210/259
See application file for complete search history.

(56) References Cited

U.S. PATENT DOCUMENTS 4,289,709 A    9/1981    Kaiser
4,289,710 A    9/1981    Kaiser
5,354,878 A    10/1994    Connemann et al.

(Continued)

FOREIGN PATENT DOCUMENTS

JP    52-052902    4/1977

(Continued)

OTHER PUBLICATIONS

Supplementary European Search Report dated Dec. 3, 2009, for Application No. EP 04 81 9331.

(Continued)

*Primary Examiner*—Ellen M McAvoy
*Assistant Examiner*—Latosha Hines
(74) *Attorney, Agent, or Firm*—Antonelli, Terry, Stout & Kraus, LLP.

(57)    ABSTRACT

A process for producing diesel fuel oil from fat and oil comprises producing fatty acid methyl ester for diesel fuel in accordance with transesterification of the fat and oil with methanol, wherein the process further comprises a step of converting glycerol formed as a by-product into methanol, and the obtained methanol is used as a material for the transesterification. In the step of converting glycerol formed as a by-product into methanol, water in an equimolar amount or more to the amount of glycerol is added to glycerol, the obtained mixture is gasified under a pressure of 2 MPa or greater at a temperature of 700° C. or higher to convert the mixture into a gas comprising carbon monoxide and hydrogen, and carbon monoxide and hydrogen are then converted into methanol in accordance with a methanol synthesis process.

9 Claims, 1 Drawing Sheet

U.S. PATENT DOCUMENTS

| | | |
|---|---|---|
| 7,145,026 B2 * | 12/2006 | Fleisher .................... 554/184 |
| 2001/0042340 A1 | 11/2001 | Tateno et al. |
| 2003/0111410 A1 * | 6/2003 | Branson .................... 210/603 |
| 2005/0210739 A1 * | 9/2005 | Esen et al. .................... 44/605 |

FOREIGN PATENT DOCUMENTS

| | | |
|---|---|---|
| JP | 61-232203 | 10/1986 |
| JP | 06-321502 | 11/1994 |
| JP | 2000-328077 | 11/2000 |
| JP | 2001-098284 | 4/2001 |
| JP | 2003-096473 | 4/2003 |
| JP | 2003-306685 | 10/2003 |

OTHER PUBLICATIONS

R. J. Evans, et al., "Renewable Hydrogen Production by Catalytic Steam Reforming of Peanut Shells Pyrolysis Products", *Fuel Chemistry Division Preprints*, vol. 47, No. 2, 2002, pp. 757 and 758.

* cited by examiner

PROCESS FOR PRODUCING DIESEL FUEL OIL FROM FAT

TECHNICAL FIELD

The present invention relates to a process for producing diesel fuel oil from fat and oil. More particularly, the present invention relates to a process for producing a biomaterial-derived diesel fuel oil (fatty acid methyl ester) using fat and oil as the raw material, wherein glycerol formed as a by-product in the transesterification of the fat and oil with methanol is chemically converted into methanol and the formed methanol is used as the raw material for the transesterification.

BACKGROUND ART

Recently, the utilization of the biomass energy is pushed forward from the standpoint of cleaning the environment of the earth and decreasing the amount of discharged carbon dioxide. A fatty acid methyl ester obtained from fat and oil derived from plants is attracting attention as one of the biomass energy since the ester can be used for existing diesel engines without further treatments.

A fatty acid methyl ester obtained from waste food oils is being practically used in Japan. A fatty acid methyl ester obtained from plant oils such as rapeseed oil is in the stage close to the practical use in Europe and America.

As described above, fatty acid methyl ester is expected to be a fuel oil suppressing adverse effects on the environment and replacing gas oil. However, it is necessary that glycerol formed as a by-product during the production be utilized effectively. In particular, this is a great problem when the fatty acid methyl ester is produced in a great amount. For utilization of glycerol formed as a by-product, it is heretofore discussed that the glycerol might be sold in the market as a high purity glycerol after being treated in accordance with the processes of preliminary purification, distillation and purification similar to the processes heretofore conducted in the fat and oil chemical plants. However, it is the actual present situation that glycerol formed as a by-product is burned as fuel or for disposal since the above glycerol is expensive due to the small amount of production. Glycerol formed as a by-product can be supplied at a cost comparable to the cost of glycerol shipped from fat and oil chemical plants when the glycerol is produced in a great amount. However, since the demand and the supply of glycerol are already in the balanced condition in the market, it is worried that an additional supply of glycerol in a great amount would disturb the market (for example, "Biomass Handbook", edited by the Japanese Society of Energy, 2002, pages 138 to 143). Although novel applications of glycerol have been sought for, the possibility of overcoming the problem in near future is small. Therefore, the biomaterial-derived diesel fuel described above is considered to be a biomass energy accompanied with the problem of the treatment of glycerol formed as a by-product.

DISCLOSURE OF THE INVENTION

Under the above situation, the present invention has an object of overcoming the problem of disposal or effective utilization of glycerol formed as a by-product in the process for producing fatty acid methyl ester used as the diesel fuel oil from fat and oil which is attracting attention as the biomass energy.

As the result of extensive studies by the present inventors to achieve the above object, it was conceived that glycerol formed as the by-product was converted into methanol and the obtained methanol was consumed as the raw material for the transesterification when a fatty acid methyl ester was produced in a great amount as the biomaterial-derived diesel fuel oil. The present invention has been completed based on the concept.

The present invention provides a process for producing diesel fuel oil from fat and oil which comprises producing a fatty acid methyl ester for diesel fuel in accordance with transesterification of the fat and oil with methanol, wherein the process further comprises a step of converting glycerol formed as a by-product into methanol, and methanol obtained by the conversion is used as a material for the transesterification.

In the process for producing diesel fuel oil from fat and oil of the present invention, it is preferable that, in the step of converting glycerol formed as a by-product into methanol, water in an equimolar amount or more to an amount of glycerol is added to glycerol, an obtained mixture is gasified under a pressure of 2 MPa or greater at a temperature of 700° C. or higher to convert the mixture into a gas comprising carbon monoxide and hydrogen, and carbon monoxide and hydrogen are then converted into methanol in accordance with a methanol synthesis process.

In the above process, it is preferable that the methanol synthesis process is a process conducted under a pressure of 2 MPa or greater at a temperature of 200° C. or higher in a presence of a methanol synthesis catalyst. When the pressure is within the above range, the gas from the gasification step can be introduced without elevating or with only a small elevation of the pressure in the step of methanol synthesis, and the process can be simplified and made inexpensive remarkably. Therefore, the entire process for producing the diesel fuel oil can be simplified and made compact.

In the conversion of glycerol formed as a by-product into methanol, the cost of glycerol used as the raw material is evaluated as zero or below zero when the expense necessary for disposal is considered. When the scale merit of the facility can be expected, the cost of producing methanol will be lower than the price of fresh methanol. In this case, the obtained methanol is economically advantageous as the raw material for producing a fatty acid methyl ester, and the unit of methanol for producing diesel fuel oil can also be decreased to a great degree.

In accordance with the process of the present invention, glycerol formed as a by-product during the production of a fatty acid methyl ester for the diesel fuel oil from fat and oil is converted into methanol, and the obtained methanol is used as the raw material for producing the diesel fuel oil. Therefore, glycerol can be consumed within the production system of the diesel fuel oil, and the problem of the fatty acid methyl ester as the biomass energy can be overcome.

In the step of converting glycerol formed as a by-product into methanol in the process for producing diesel fuel oil of the present invention, water in an equimolar amount or more to an amount of glycerol is added to glycerol, and the obtained mixture is gasified under a pressure of 2 MPa or greater at a temperature of 700° C. or higher to convert the mixture into a gas comprising carbon monoxide and hydrogen. Therefore, the apparatus for gasification and decomposition can be made compact, and the increase in the pressure in the following step of methanol synthesis can be suppressed. The process is practically advantageous from the standpoint of the cost of the apparatus and the required energy.

THE MOST PREFERRED EMBODIMENT TO CARRY OUT THE INVENTION

Figure 1:
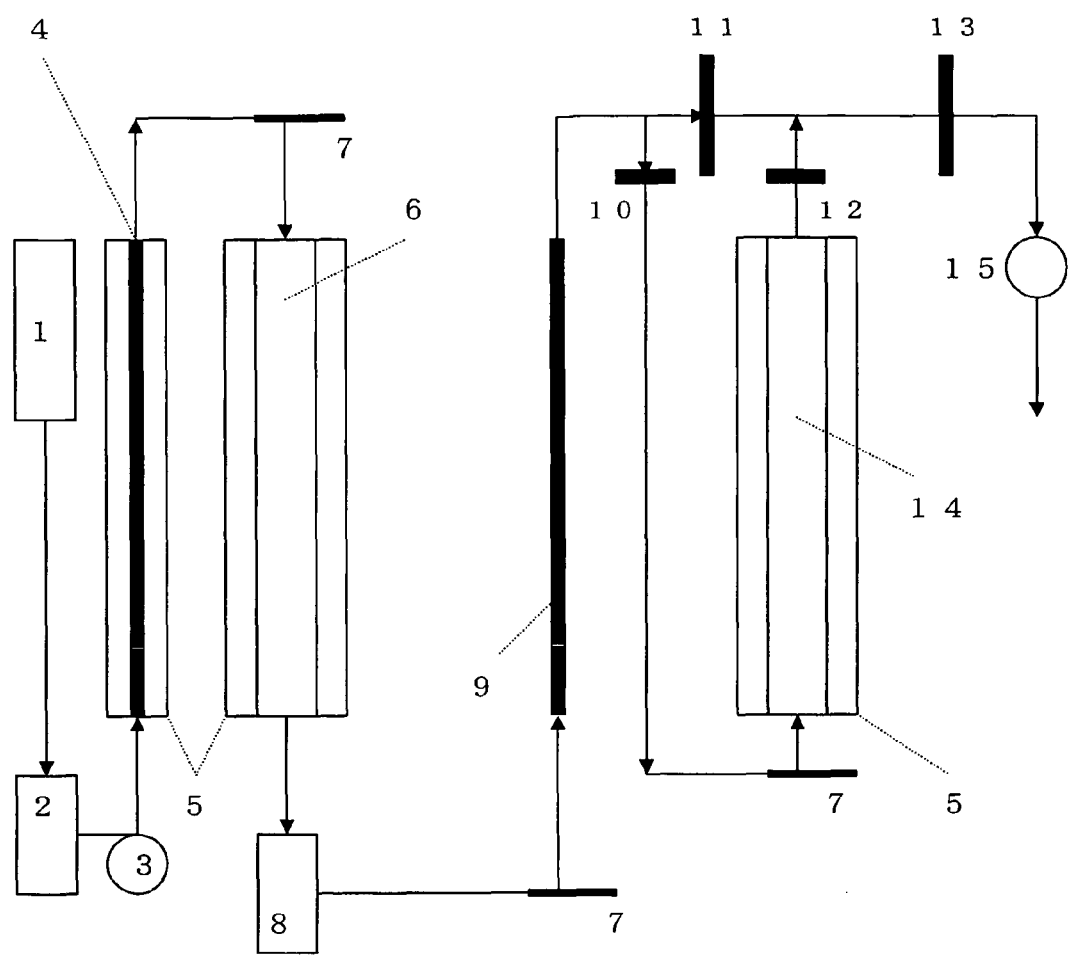
FIG. 1 shows an apparatus used in Examples 1 to 3. The numbers in FIG. 1 has the following meanings:
1: A raw material tank
2: A liquid feeding pump
3: A pressure gauge
4: A preheating tube
5: An electric heater
6: A reactor tube for gasification
7: A thermometer of the thermocouple type
8: A receiver for separately receiving solid substances
9: A cooling tube
10: Stop valve A
11: Stop valve B
12: Stop valve C
13: A back pressure valve
14: A reactor tube for methanol synthesis
15: A gas sampler

The present invention will be described more specifically in the following.

The process for producing fatty acid methyl ester for diesel fuel oil of the present invention comprises (1) a step of transesterification of fat and oil with methanol in the presence of an alkali catalyst, an alkali solid catalyst, an acidic solid catalyst or an enzyme catalyst or in the absence of catalysts, (2) a step of removing methanol in an excess amount from the reaction fluid by distillation after the reaction, (3) a step of separating a layer of a light fluid comprising fatty acid methyl ester as the main component and a layer of a heavy fluid comprising glycerol as the main component from each other, (4) a step of obtaining diesel fuel oil by purifying the above light fluid, and (5) a step of separating glycerol in the heavy fluid and converting the separated glycerol into methanol.

Examples of the fat and oil used as the raw material in the step of transesterification include rapeseed oil, sesame oil, soy bean oil, corn oil, sun flower oil, palm oil, palm kernel oil, coconut oil, safflower oil and waste edible oils derived from these oils. The fat and oil may be used singly or as a mixture of two or more.

The content of methanol in the reaction fluid of transesterification is, in general, in the range of 12 to 30 parts by weight per 100 parts by weight of the fat and oil. Methanol is used in an excess amount relative to the amount of the ester linkage, i.e., in an amount by equivalent 1.1 to 2.8 times as much as the amount by equivalent of the ester linkage.

When a catalyst is used, it is preferable that an alkali catalyst soluble in methanol, an alkali solid catalyst, an acidic solid catalyst or an enzyme catalyst is used. When a solid catalyst is used, it is preferable that the reaction is conducted in accordance with a flow process using a fixed bed. When a catalyst soluble in methanol is used, the amount of the catalyst is, in general, in the range of 0.2 to 1.5 parts by weight per 100 parts by weight of the fat and oil. The reaction can be conducted in the absence of catalysts when methanol is in the supercritical condition.

The transesterification is conducted, in general, at a temperature in the range of 60 to 350° C. for a time in the range of 0.05 to 6.0 hours.

When methanol in an excess amount is removed from the reaction fluid by distillation after the transesterification is completed and the resultant fluid is left standing, the fluid is separated into a layer of a light fluid comprising fatty acid methyl ester as the main component and a layer of a heavy fluid comprising glycerol as the main component.

The two fluid layers are separated from each other. The light fluid comprising fatty acid methyl ester is treated in accordance with a suitable purification process, and a fluid having the following quality which can be used as the diesel fuel oil is obtained.

The quality required for fatty acid methyl ester which can be used as the diesel fuel oil is approximately as follows.

The purity of fatty acid methyl ester: 98% or greater; and the contents of monoglycerides: 0.8% or smaller; diglycerides: 0.4% or smaller, triglycerides (the unreacted oil): 0.4% or smaller; and glycerol: 0.02% or smaller.

The heavy fluid comprises glycerol as the main component and small amounts of monoglycerides and diglycerides. When an alkali catalyst soluble in methanol is used in the transesterification, the almost entire amount of the alkali component and a fatty acid soap are comprised in the heavy fluid.

The present invention is characterized in that the process further comprises the step of converting glycerol obtained above into methanol. The step of converting glycerol into methanol will be described specifically in the following.

The step of converting glycerol into methanol in the process of the present invention comprises a step of converting glycerol into a gas comprising molecules suitable for synthesis of methanol, i.e., carbon monoxide and hydrogen, as the main components, and a step of obtaining methanol from carbon monoxide and hydrogen.

Since glycerol is thermally decomposed at 290° C., it is possible that carbon monoxide and hydrogen are obtained by introducing glycerol alone into a gasification apparatus kept at a, temperature of 300° C. or higher. However, char, tar and carbon dioxide are also formed at this time. To suppress the formation of char and tar, it is preferable that water is introduced into the gasification apparatus as the gasifying agent in combination with glycerol.

When a mixture of glycerol and water are introduced into the gasification apparatus, it is preferable that a mixture containing the same amounts by mole of glycerol and water is used so that the amounts of formed carbon monoxide and hydrogen are maximized.

It is preferable that the temperature of the gasification apparatus is 700° C. or higher so that the formation of carbon dioxide is suppressed to as small an amount as possible. It is also preferable that the temperature is 950° C. or lower from the standpoint of economy since the effect of suppressing the formation of carbon dioxide is improved only slightly even when the temperature is raised at 1,000° C. or higher.

Methane is also formed as a by-product in the reaction of forming carbon monoxide and hydrogen from glycerol. To decrease the amount of methane formed as a by-product, a reforming catalyst for converting methane into carbon monoxide and hydrogen may be packed into the gasification apparatus of glycerol, or a reforming step may be conducted separately after the gasification step. As the catalyst for reforming of methane, a conventional catalyst such as an Ni-based catalyst and a Ru-based catalyst can be used.

It is possible that glycerol containing the alkali catalyst used in the transesterification is treated in the same manner, and an alkaline substance which can be reused for the transesterification catalyst can be recovered as the residue of gasification. In this case, the apparatus for reforming of methane is set separately from the gasification apparatus. And an apparatus for trapping the alkali is set between the gasification apparatus and the apparatus for reforming of methane.

Methanol is synthesized from carbon monoxide and hydrogen obtained as described above. As the process for the synthesis of methanol, a conventional process can be used.

As the catalyst for the synthesis of methanol, any of conventional catalysts can be used without particular restrictions. Due to the great activity and the great selectivity, CuO—ZnO—Al$_2$O$_3$ and the like are preferable. In general, it is preferable that the temperature of the reaction is in the range of 200 to 300° C. and the pressure of the reaction is in the range of 2 to 10 MPa.

Since the synthesis of methanol is conducted under a pressure of 2 to 10 MPa, it is preferable that the apparatus for gasification of glycerol is operated under a pressure of 2 MPa or greater and more preferably under a pressure which is the same as or greater than the pressure in the synthesis of methanol since the step of raising the pressure can be omitted and the process can be simplified.

Unlike a process comprising introducing a solid or gaseous material, the gasification under an added pressure described above can be achieved easily using less energy since a liquid, i.e., the aqueous solution of glycerol, is introduced into the pressurized gasification apparatus.

As the apparatus for synthesis of methanol, a fixed bed reactor of the heat exchange type which has a double-pipe structure or a multi-pipe structure and is packed with the catalyst described above, is used.

In the gasification reaction of glycerol described above, in accordance with the stoichiometry, 2 moles of carbon monoxide and 5 moles of hydrogen are formed from 1 mole of glycerol (and 1 mole of water) in accordance with the following equation:

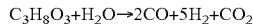

$$C_3H_8O_3 + H_2O \rightarrow 2CO + 5H_2 + CO_2$$

In accordance with the stoichiometry, it is possible that 2 moles of methanol is synthesized from 2 moles of carbon monoxide and 4 moles of hydrogen:

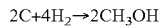

$$2C + 4H_2 \rightarrow 2CH_3OH$$

In accordance with the stoichiometry, 2 moles of methanol is obtained from 1 mole of glycerol in the conversion of glycerol into methanol in the process of the present invention, and the calculated maximum yield is 32×2/92×100=70%.

The calculated yield in the conversion of glycerol into methanol is 70% as described above. When the equilibrium degree of the reaction in the synthesis of methanol (for example, about 80% at 5 MPa and 250° C.) is considered, the yield of the reaction is estimated to be about 70% even when the time of the reaction is sufficiently long. Therefore, the actual yield of the conversion is about 50%. Since the amount of glycerol formed as the by-product is about the same as the amount of methanol used as the raw material in the transesterification, about ½ of the necessary amount of methanol can be recovered from glycerol, and the unit of methanol can be reduced to about ½.

The heat energy to maintain the temperature of the gasification of glycerol can be supplied by combustion of carbon monoxide and hydrogen remaining unreacted after the synthesis of methanol. In the conventional process for synthesis of methanol, the unreacted gases are recycled to increase the yield. In contrast, in the present invention, it is preferable that the unreacted gases are combusted so that the closed reaction system is achieved with respect to the thermal energy and complication in the process can be avoided.

When the unreacted gases are not recycled in the reaction of synthesis of methanol as described above, it is necessary that the reaction is designed in a manner such that the time of the reaction is sufficiently maintained so that the sufficient degree of the reaction is surely obtained.

Since glycerol is a clean raw material, additional steps such as the step of desulfurization is not necessary. The step of desulfurization is ordinarily conducted before the reforming in the process for synthesis of methanol using synthesis gas derived from natural gas containing sulfur components. This shows that the process of the present invention is a simple process.

After the synthesis of methanol, it is necessary that impurities in small amounts (methyl formate, higher alcohols and the like) be removed in accordance with a purification process such as distillation. It is preferable that energy necessary for the above purification is supplied by the heat obtained by combustion of the unreacted gases in the process for the synthesis of methanol.

As described above, the process of the present invention is the process for producing a fatty acid methyl ester having the quality which can be used for the diesel fuel oil in accordance with the transesterification of fat and oil with methanol, wherein methanol obtained by converting glycerol of a by-product of the reaction is used as a portion of the raw materials in the transesterification.

EXAMPLES

The present invention will be described more specifically with reference to examples in the following. However, the present invention is not limited to the examples.

Example 1

The gasification of an aqueous solution of glycerol was conducted using an apparatus shown in FIG. 1.

In the present example, stop valve A 10 is closed, stop valve B 11 is opened and stop valve C 12 is closed. The reaction tube for synthesis of methanol is not used.

A reaction tube for gasification 6 (a tube made of stainless steel SUS316; the outer diameter: 6.24 mm; the thickness: 1.24 mm; and the length: 1 m) was heated by an electric heater 5. The pressure was controlled at 3 MPa and the temperature of the gasification was controlled at 780° C. by operations of a liquid transfer pump 2 (INTELLIGENT HPLC PUMP; manufactured by NIPPON BUNKO Co., Ltd.) and a back pressure valve 13 (a fully automated pressure valve SCF-BPQ; manufactured by NIPPON BUNKO Co., Ltd.).

A glycerol solution containing water in the same amount by mole as that of glycerol was prepared and used as the solution for the treatment (the content of glycerol: 84% by weight). The prepared solution was introduced into the reaction tube of gasification by a liquid feeding pump 2 at a rate of 100 mg/minute. After the pressure and the temperature reached the respective prescribed values and remained constant, the operation was continued for 5 hours.

After 5 hours, a sample of the gas was taken by a gas sampler 15 and analyzed in the online condition in accordance with the gas chromatography. The composition (the contents expressed as % by volume) of the sample gas was found to be as follows: carbon monoxide: 19%; hydrogen: 59%; methane: 5%; and carbon dioxide gas: 17%. After the operation was completed, the inside of the reaction tube for gasification 6 and a receiver for separately receiving solid substances 8 were examined, and almost no solid substances were found.

Example 2

The same procedures as those conducted in Example 1 were conducted except that a catalyst which was prepared by supporting nickel on alumina and formed into a size of 1 mm was packed into a latter half portion having a length of 50 cm of the reaction tube of gasification. The composition of the sample gas was found to be as follows: carbon monoxide: 23%; hydrogen: 63%; and carbon dioxide gas: 14%. Almost no methane was found.

Example 3

In the present example, synthesis of methanol was conducted continuously after the gasification of glycerol. Therefore, stop valve A 10 was opened, stop valve B 11 was closed, and stop valve C 12 was opened.

The condition of the gasification was the same as that in Example 2 except that the pressure of the operation was 5 MPa.

The material, the diameter and the length of the reaction tube for synthesis of methanol 14 were the same as those of the reaction tube for gasification. A portion having a length of 1 m of the reaction tube for synthesis of methanol was packed with a catalyst which was prepared by supporting copper oxide and zinc oxide formed from the respective metal nitrates in accordance with the precipitation process on alumina and formed to a size of 1 mm. The gas discharged from the reaction tube of gasification 6 was cooled in a cooling tube 9 and introduced into the reaction tube for synthesis of methanol 14. The temperature of the gas was controlled at 250° C. Two hours after the start of the reaction, the catalyst was sufficiently reduced at 400° C. Then, the temperature was set at 250° C., and the reaction was resumed and continued. The pressure of the reaction was 5 MPa, which was the same as that in the gasification.

When the steady state was achieved, a sample of the gas was taken by a gas sampler 15 and analyzed in the online condition in accordance with the gas chromatography. The composition (the contents expressed as % by volume) of the sample gas was found to be as follows: carbon monoxide: 8%; hydrogen: 42%; methanol: 28%; and carbon dioxide gas: 21%. Impurities in an amount of about 1% were also found. When the above value was converted into the value by weight neglecting the amount of the impurities, the content of methanol was found to be 42%.

Since the raw materials were supplied at a rate of 100 mg/minute, the rate of formation of methanol was 42 mg/minute. Since glycerol was supplied at a rate of 84 mg/minute, the yield of methanol based on the amount of glycerol was calculated to be 50%.

INDUSTRIAL APPLICABILITY

In accordance with the process for producing diesel fuel oil from fat and oil of the present invention, glycerol formed as a by-product in the production is converted into methanol and used as the raw material in the process. Therefore, glycerol can be consumed within the process for producing diesel fuel oil, and the problem accompanied with using the fatty acid methyl ester as the biomass energy can be overcome.

In accordance with the process for producing diesel fuel oil of the present invention, the apparatus for gasification and decomposition and the apparatus for synthesis of methanol can be made compact by suitably setting the condition of gasification to produce carbon monoxide and hydrogen in the conversion of glycerol formed as a by-product into methanol, and the process is practically advantageous with respect to the cost of the apparatuses and the required energy.

The invention claimed is:

1. A process which comprises producing fatty acid methyl ester for diesel fuel oil in accordance with transesterification of fat and oil with methanol, whereby glycerol is formed as a by-product, converting said glycerol formed as a by-product into methanol, wherein said converting said glycerol formed as a by-product into methanol includes converting glycerol into carbon monoxide and hydrogen, and obtaining the methanol from the carbon monoxide and hydrogen, and using said methanol obtained by the conversion as a reactant for further transesterification of fat and oil in producing further fatty acid methyl ester for diesel fuel oil.

2. A process according to claim 1, wherein, in the step of converting glycerol formed as a by-product into methanol, water in an equimolar amount or more to an amount of glycerol is added to glycerol, an obtained mixture is gasified under a pressure of 2 MPa or greater at a temperature of 700° C. or higher to convert the mixture into a gas comprising carbon monoxide and hydrogen, and carbon monoxide and hydrogen are then converted into methanol in accordance with a methanol synthesis process.

3. A process according to claim 2, wherein the methanol synthesis process is a process conducted under a pressure of 2 MPa or greater at a temperature of 200° C. or higher in a presence of a methanol synthesis catalyst.

4. A process according to claim 1, wherein glycerol is converted into carbon monoxide and hydrogen in the presence of water.

5. A process according to claim 1, wherein the converting of the glycerol into carbon monoxide and hydrogen is performed in a gasification apparatus, and said gasification apparatus includes a reforming catalyst for converting methane into carbon monoxide.

6. A process according to claim 1, wherein in said converting glycerol into carbon monoxide and hydrogen, methane is produced as a by-product, and the process includes an additional step of reforming said methane into carbon monoxide and hydrogen.

7. A process according to claim 1, including a further step, prior to said converting said glycerol, of separating said glycerol formed as a by-product from the fatty acid methyl ester for diesel fuel oil, with the separated glycerol being converted into said methanol.

8. A process according to claim 7, wherein subsequent to the further step of separating, separated fatty acid methyl ester is subjected to a purification process to provide the diesel fuel oil.

9. A process according to claim 2, wherein said obtained mixture is gasified at a temperature in a range of 700°-950° C.

* * * * *